United States Patent [19]

Haddad et al.

[11] Patent Number: 4,629,552
[45] Date of Patent: Dec. 16, 1986

[54] FCC CATALYST SEPARATION METHOD

[75] Inventors: James H. Haddad, Princeton Junction; Hartley Owen, Belle Mead, both of N.J.

[73] Assignee: Mobil Oil Corporation, New York, N.Y.

[21] Appl. No.: 632,084

[22] Filed: Jul. 18, 1984

[51] Int. Cl.[4] ............... C10G 11/18; B01J 8/24
[52] U.S. Cl. ................... 208/161; 208/153; 208/164; 422/144
[58] Field of Search .............. 208/153, 161, 164; 422/144

[56] References Cited

U.S. PATENT DOCUMENTS

| | | | |
|---|---|---|---|
| 2,337,684 | 12/1943 | Scheineman | 422/144 |
| 2,606,097 | 8/1952 | Goodson et al. | 208/153 |
| 2,656,242 | 10/1953 | Matheson | 23/1 |
| 2,784,803 | 3/1957 | Saxton | 422/144 |
| 2,838,063 | 6/1958 | Weits et al. | 208/161 |
| 2,886,419 | 4/1959 | Orr et al. | 422/144 |
| 2,901,331 | 8/1959 | Held et al. | 208/161 |
| 2,934,494 | 4/1960 | Kleiber | 422/144 |
| 3,123,547 | 3/1964 | Palmer et al. | 208/78 |
| 3,261,776 | 7/1966 | Baumann et al. | 208/153 |
| 3,355,380 | 11/1967 | Luckenbach | 208/153 |
| 3,661,799 | 5/1972 | Cartmell | 208/153 |
| 3,732,081 | 5/1973 | Carson | 208/161 |
| 3,785,962 | 1/1974 | Conner et al. | 208/153 |
| 4,035,284 | 7/1977 | Gross et al. | 208/164 |
| 4,043,899 | 8/1977 | Anderson et al. | 208/161 |
| 4,070,159 | 1/1978 | Myers et al. | 208/161 |
| 4,173,527 | 11/1979 | Heffley et al. | 422/145 |
| 4,219,407 | 8/1980 | Haddad et al. | 208/161 |
| 4,295,961 | 10/1981 | Fahrig et al. | 208/153 |
| 4,308,238 | 12/1981 | Greenwood | 422/144 |
| 4,390,503 | 6/1983 | Walters et al. | 208/164 |
| 4,404,095 | 9/1983 | Haddad et al. | 208/153 |
| 4,455,220 | 6/1984 | Parker et al. | 208/164 |
| 4,478,708 | 10/1984 | Farnsworth | 208/161 |

FOREIGN PATENT DOCUMENTS 0785797 11/1957 United Kingdom ............... 208/161

Primary Examiner—John Doll
Assistant Examiner—Lance Johnson
Attorney, Agent, or Firm—Alexander J. McKillop; Michael G. Gilman; Dennis P. Santini

[57] ABSTRACT

A method and apparatus for improving the flow of catalyst particles from a riser conversion zone to a separator in a fluidized catalytic cracking (FCC) unit. The exit of the riser conversion zone is equipped with a deflector mounted so as to redirect catalyst particle and gas suspension movement toward a separator inlet, thus preventing rebound back into the riser conversion zone. The catalyst deflector, in other embodiments, can be combined with one or more of a short contact time stripper, a stripper mount in or adjacent the exhaust barrel of a separator, and/or a catalyst seal pot, all serving to reduce "residence" time of hydrocarbons with catalyst particles.

5 Claims, 11 Drawing Figures

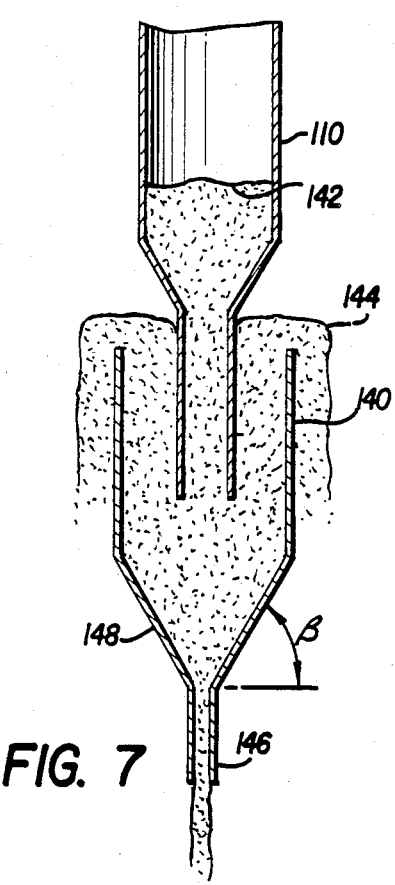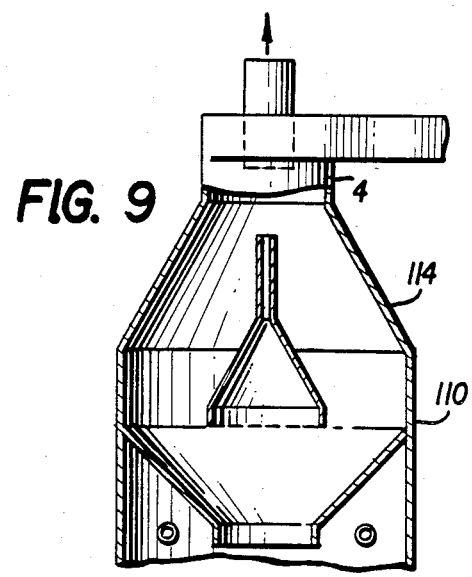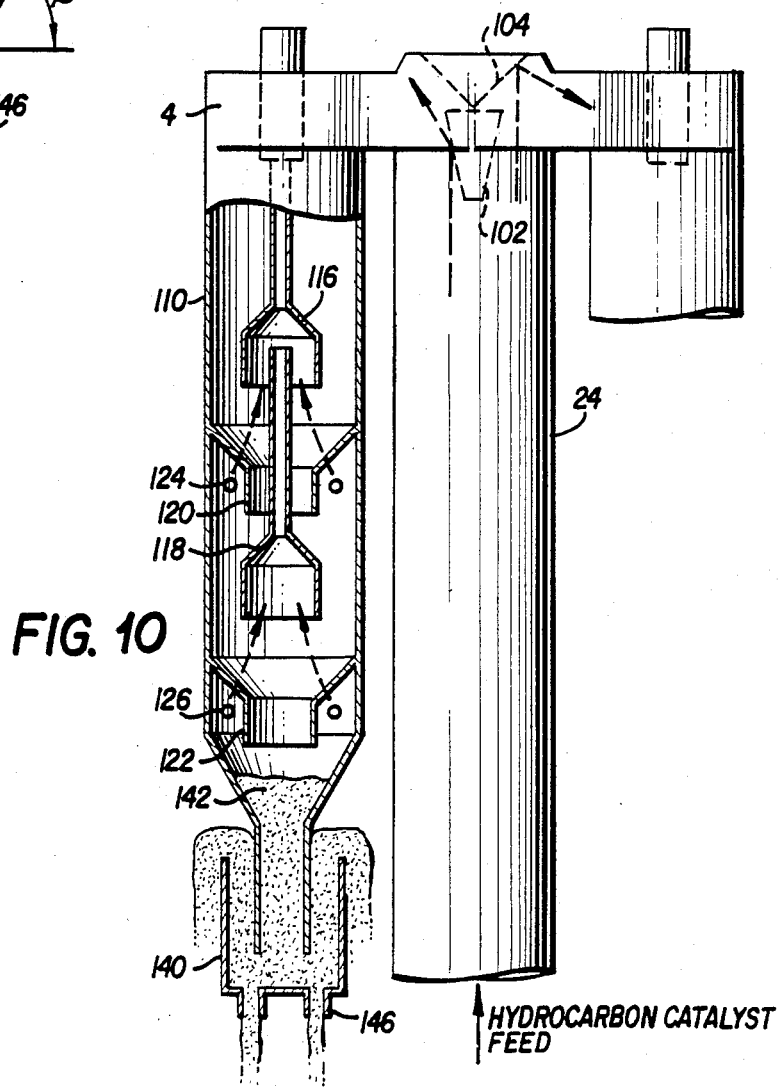

FCC CATALYST SEPARATION METHOD

BACKGROUND OF THE INVENTION

1. Field of the Invention

The present invention relates to methods and apparatus for the separation of a catalyst and hydrocarbon materials in a fluidized catalytic cracking (FCC) unit. More particularly, the present invention relates to an improved method and apparatus for reducing the contact time between catalyst and hydrocarbon materials in an FCC riser prior to "separation" in a conventional separator.

2. Discussion of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered, requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition with a hydrocarbon feed generally upwardly through one or more riser conversion zones (FCC cracking zones), providing a hydrocarbon residence time in each conversion zone in the range of 0.5 to about 10 seconds, and usually less than about 8 seconds. High temperature riser hydrocarbon conversions, occurring at temperatures of at least 1000° F. or higher and at 0.5 to 4 seconds hydrocarbon residence time in contact with the catalyst in the riser, are desirable for some operations before initiating separation of vaporous hydrocarbon product materials from the catalyst.

Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the hydrocarbon conversion zone. The entrained hydrocarbons are subjected to further contact with the catalyst until they are removed from the catalyst by a separator, which could be a mechanical means, and/or stripping gas in a separate catalyst stripping zone. Hydrocarbon conversion products separated and materials stripped from the catalyst are combined and passed to a product fractionation step. Stripped catalyst containing deactivating amounts of carbonaceous material, hereinafter referred to as coke, is then passed to a catalyst regeneration operation.

Of particular interest has been the development of methods and systems for separating catalyst particles from a gas suspension phase exiting the riser and containing catalyst particles and vaporous hydrocarbon product materials, particularly the separation of high activity crystalline zeolite cracking catalysts, under more efficient separating conditions so as to reduce overcracking of hydrocarbon conversion products and promote the recovery of desired products of a hydrocarbon conversion operation. Cyclonic equipment is now typically used for efficient separation of fluidizable catalyst particles from the gas suspension phase. However, present day cyclonic equipment often permits an undesirable extended residence time of the product vapor within a large reactor vessel. This extended residence time reduces the desired product yield by as much as 4% through non-selective thermal cracking. Recent developments in this art have been concerned with the rapid separation and recovery of entrained catalyst particles from the gas suspension phase.

Various processes and mechanical means have been employed heretofore to effect rapid separation of the catalyst phase from the hydrocarbon phase at the termination of the riser cracking zone, to minimize contact time of the catalyst with cracked hydrocarbons. A representative one of these is shown in FIG. 1 and discussed below by way of general background for the present invention.

FIG. 1 in the present application corresponds to a simplified illustration of FIG. 2 from Anderson et al, U.S. Pat. No. 4,043,899, where similar reference numbers have been utilized to illustrate similar structures in the two figures. Anderson et al discloses a method for rapid separation of a product suspension, comprising the vaporous hydrocarbon product phase and fluidized catalyst particles (HYC+CAT, as seen entering riser conversion zone 24), by discharging the entire suspension directly from the riser conversion zone into a cyclone separation zone 4. The cyclone is modified to include a separate cyclonic stripping of the catalyst separated from the hydrocarbons vapors in an auxiliary stripper. The cyclone separator is modified to include an additional downwardly extending section comprising a lower cyclone stage 11. In this arrangement, catalyst separated from the gasiform material in the upper stage of the cyclone, slides along a downwardly sloping helical baffle 12 to the lower cyclone, where stripping steam (STM) is introduced to further separate entrained hydrocarbon products from the catalyst recovered from the upper cyclone. The steam and stripped hydrocarbons are passed from the lower cyclone through a concentric pipe 8, where they are combined with the hydrocarbon vapors separated in the upper cyclone.

The separated, stripped catalyst is collected and passes from the cyclone separator 4 by conventional means through a dipleg 22 into a catalyst bed 60 in the bottom of reactor vessel 26 and out catalyst exit 44. This lower portion of vessel 26 also acts as a catalyst stripping section, comprising baffles 32, 34, and 36, with steam being supplied to the catalyst bed thereunder. Vaporous material separated in cyclone 4 can also be discharged into cyclone 52 and subsequently passed by way of conduit 54 into chamber 46 and withdrawn therefrom by conduit 48 for eventual fractionation.

While the Anderson et al patent, along with U.S. Pat. No. 4,219,407 to Haddad et al (herein incorporated by reference), represent improvements in the field of rapidly separating and stripping hydrocarbon materials from catalyst particles, there is still a need to further reduce total contact time between hydrocarbon materials and catalysts to reduce, to the extent possible, non-selective cracking.

For example, one problem associated with the FIG. 1 system is that upwardly directed catalyst particles "rebound" off the top of riser 24 back into the continuous upward flow of hydrocarbons and catalyst. Thus, the velocity of the rebounding particles must be reduced by dynamic pressure of the rising hydrocarbon/catalyst suspension before again moving upwardly in the riser toward its exit at separator 4. The additional "residence" time of hydrocarbon vapor and catalyst caused by this rebounding effect causes overcracking and loss of precise control of cracked products.

SUMMARY OF THE INVENTION

It is an object of the present invention to provide an improved method and apparatus for ensuring a high percentage of catalyst particles remain in a riser conversion zone only for a desired period of time and are subsequently passed, without substantial rebounding, directly into a catalyst separator device.

It is a further object of the present invention to provide an improved method and apparatus for turning the flow of catalyst particles out of the riser conversion zone and into a catalyst separator device, thereby minimizing rebounding of catalyst particles into the upwardly rising suspension of catalyst and hydrocarbons.

In its method aspects, the invention achieves the above and other objects by the steps of: passing a mixture, as a suspension, of hydrocarbon feed and a catalyst through a riser conversion zone contained within a reactor vessel and cracking the hydrocarbon feed in the riser conversion zone; passing the mixture through a deflection zone in which the mixture is physically deflected toward an exit of the deflection zone and into an entrance of a separation zone; and passing the deflected mixture from the deflection zone exit to the separation zone.

In its apparatus aspects, the present invention achieves the above and other objects in an apparatus for fluid catalytic cracking of a hydrocarbon feed, comprising: a riser conversion zone formed as a vertically disposed elongated tubular conduit having upstream and downstream ends; means for introducing a suspension of hydrocarbon feed and catalyst into an upstream end of the riser conversion zone to produce a mixture of catalyst and cracked hydrocarbon feed exiting at a downstream end of the riser conversion zone; separator means, having an inlet disposed at the downstream end of the riser conversion zone, for separating at least a portion of the catalyst from the mixture in the riser conversion zone; and deflector means, connecting the downstream end of the riser conversion zone and the separator inlet, for deflecting the mixture toward the separator inlet.

The invention, in both its method and apparatus aspects, can be configured as an original installation, or as a retrofit to an existing fluid catalytic cracking reactor system.

BRIEF DESCRIPTION OF THE DRAWINGS

A more complete appreciation of the invention, and many of the attendant advantages thereof, will be readily apparent as the same becomes better understood by reference to the accompanying drawings, wherein:

FIG. 2b is a side view of the subject matter in FIG. 2a;

FIG. 7 is a side view partially in section of a further embodiment of a catalyst seal pot;

FIG. 9 is a side view partially in section of a modified cyclone separator exhaust barrel and its interconnection with a short contact time stripper; and FIG. 10 is a side view partially in section illustrating one embodiment of the present invention in which baffles serve to deflect catalyst particles into the inlet of a cyclone separator which is immediately adjacent a two-stage short contact time stripper whose lower end is sealed by a catalyst seal pot, all in accordance with the present invention.

DETAILED DESCRIPTION OF PREFERRED EMBODIMENTS

Figure 2A:
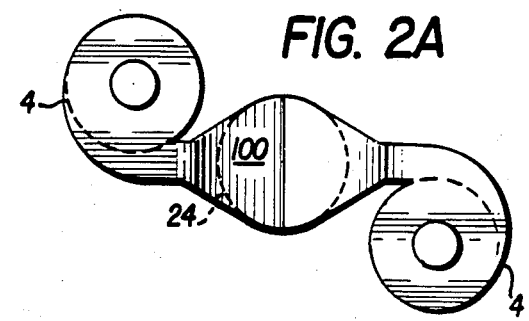
FIG. 2a is a top view of a riser conversion zone illustrating the connection to two cyclone separators in accordance with the present invention.
Figure 2B:
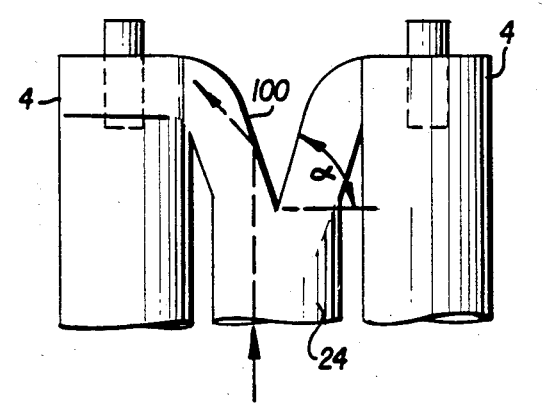
Figure 8:
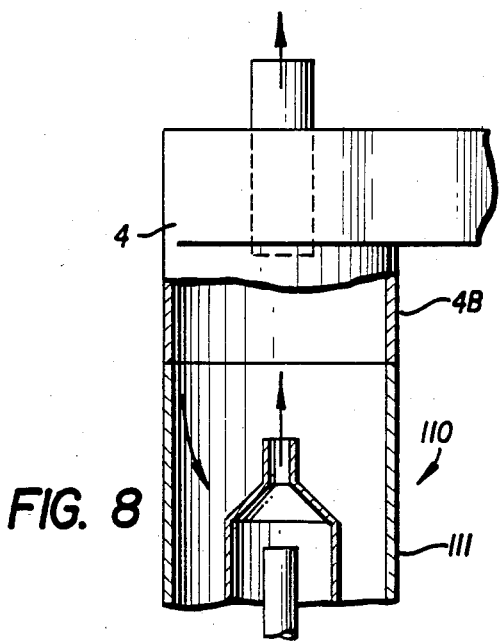
FIG. 8 is a side view partially in section of a short contact time catalyst stripper located adjacent the exhaust barrel of a cyclone separator.

The present invention is directed towards a catalyst particle deflector as a method and apparatus to reduce uncontrolled thermal cracking, as illustrated in FIGS. 2a, 2b and 10. Also discussed in the present specification is an improved short contact time stripper as an additional method and apparatus for reducing uncontrolled cracking, and various embodiments are illustrated in FIGS. 3, 4 and 8–10. These embodiments are also discussed and claimed in a copending U.S. patent application entitled "Improved FCC Catalyst Stripping Method and Apparatus" (Attorney Docket No. 2930), executed and filed concurrently herewith. The short contact time stripper may be used in an FCC installation, including the above-discussed particle deflector. Additionally discussed herein is a method and apparatus for additionally reducing uncontrolled cracking by providing a stripper adjacent the exhaust barrel of a separator, as shown in FIGS. 8–10, and a catalyst seal pot, shown in FIGS. 6, 7 and 10, both of which are also discussed and claimed in a copending U.S. patent application entitled "Method and Apparatus for Reducing Overcracking During FCC Catalyst Separation" (Attorney Docket No. 2928), executed and filed concurrently herewith. The exhaust barrel stripper and seal pot may also be used in an FCC installation, including the above-discussed particle deflector. Because each of these methods and apparatus can be utilized separately or in various combinations, a discussion of each and their interaction follows, beginning with the catalyst particle deflector of the present invention.

Figure 1:
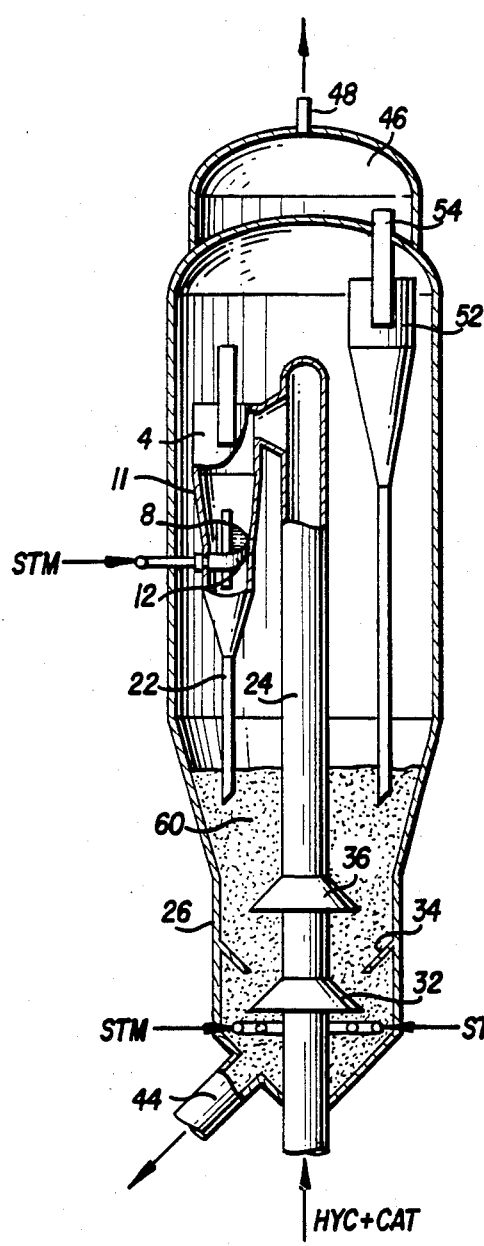
FIG. 1 is a diagrammatic sketch of the riser reactor, including catalyst stripping zone, illustrated in FIG. 2 of U.S. Pat. No. 3,043,899 to Anderson et al.

Referring now more particularly to the drawings, wherein like numerals represent like elements throughout the several views, FIGS. 2a and 2b illustrate the application of a catalyst deflector by means of a modified exit from riser conversion zone 24. A V-shaped or conical deflector 100 at the top of riser 24 transforms the upward velocity vectors of catalyst particles and hydrocarbon feed to a direction towards the inlets of cyclone separators 4. In a conventional riser outlet arrangement, where the cyclone inlet is located below the top of the riser conversion zone 24, as illustrated in FIG. 1, catalyst particles impact against the closed top of the riser and rebound back towards the riser conversion zone. Thus, the velocity of the rebounding particles must be reduced by dynamic pressure of the rising hydrocarbon feed before again moving upwards and ultimately into the cyclone separator 4. This additional "residence" time (the time during which the catalyst is in immediately contact with hydrocarbon vapor and hydrocarbon material) causes overcracking and loss of precise control of the cracked products. With deflector 100, the particle trajectories are as illustrated by the dotted line arrow in FIG. 2b, which reduces the residence time due to the rebounding of catalyst particles.

In one embodiment of the deflector, the angle $\alpha$ of the deflector surface with respect to the horizontal (for a vertical riser) is between 60° and 70°, although different angles could be utilized, depending upon the location of the cyclone separator inlet with respect to the deflector, the diameter of the riser, the distance from the riser to the separator inlet, etc. Furthermore, existing risers may be converted by the addition of baffle-type deflectors 102 and/or 104, as shown in FIG. 10. The surface of deflector 100 need not be planar and a smoothly contoured curve from the lowest point of the deflector to the upper surface of the cyclone separator inlet 4 would be advantageous, not only in the redirection of catalyst particle travel, but also to reduce any pressure drop which may be encountered between the upper portion of riser conversion zone 24 and the cyclone separator 4. Likewise, baffle-type deflectors 102 and/or 104 could also be curved to direct the catalyst-/hydrocarbon vapor flow to separator 4. While a cyclone separator 4 has been illustrated for use with deflector 100, the deflector 100 could be equally useful with many other types of separators which are known to those in the fluid catalytic cracking art.

As noted above, the deflector of the present invention can be used in combination with other methods and apparatus for reducing overcracking of hydrocarbons and these will now be described in connection with FIGS. 3-10.

Once the catalyst particles have been separated in the cyclone separator 4, it is desirable to strip any hydrocarbon vapor contained in voids between catalyst particles and within the pores of the catalyst particles themselves as soon as possible during the process. To further reduce "residence" time, a catalyst stripper can be mounted in a continuation of the separator exit barrel or immediately adjacent the exit barrel. For example, as shown in FIG. 8, a portion of a short contact time (SCT) stripper 110 (discussed in greater detail below) is located adjacent the exit barrel 4B of cyclone separator 4. Separated catalyst particles exiting the cyclone separator 4 will immediately be processed by the catalyst stripper, reducing to an absolute minimum additional contact time between the catalyst particles and hydrocarbon vapors.

Figure 5:
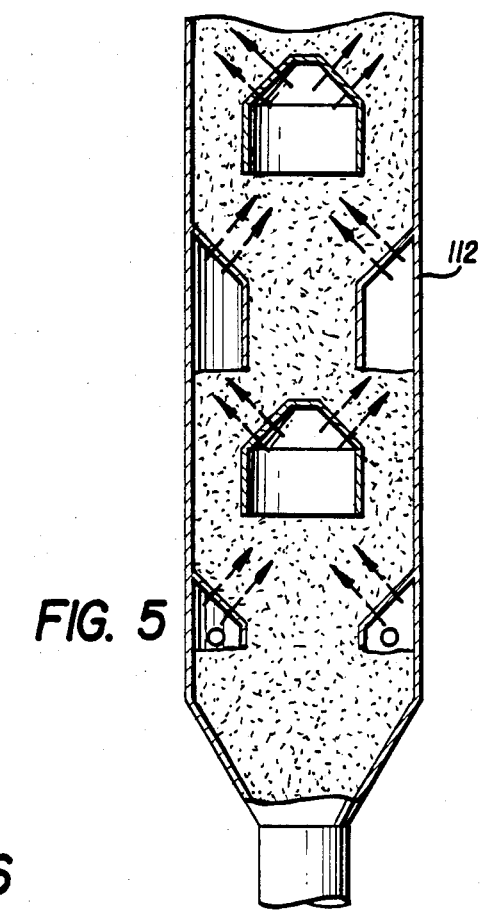
FIG. 5 is a side view partially in section of a four-stage countercurrent stripper which can be directly connected with the exhaust barrel of the cyclone separator illustrated in FIGS. 2a and 2b.

A conventional catalyst stripper could also be utilized in close proximity with the separator exit barrel and such a four-stage countercurrent stripper 112 is illustrated in FIG. 5. Stripper 112 has four stages due to the four levels of baffles and is considered "countercurrent" because the stripping gas and catalyst particles travel in opposite directions. Depending on the specifics of the stripper and the separator designs utilized, a conical section 114, or some other section joining the stripper to the separator exhaust, could be utilized. FIG. 9, for example, illustrates the combination of a conical diffuser connecting the exit barrel of cyclone separator 4 with the inlet of an SCT stripper 110.

Figure 3:
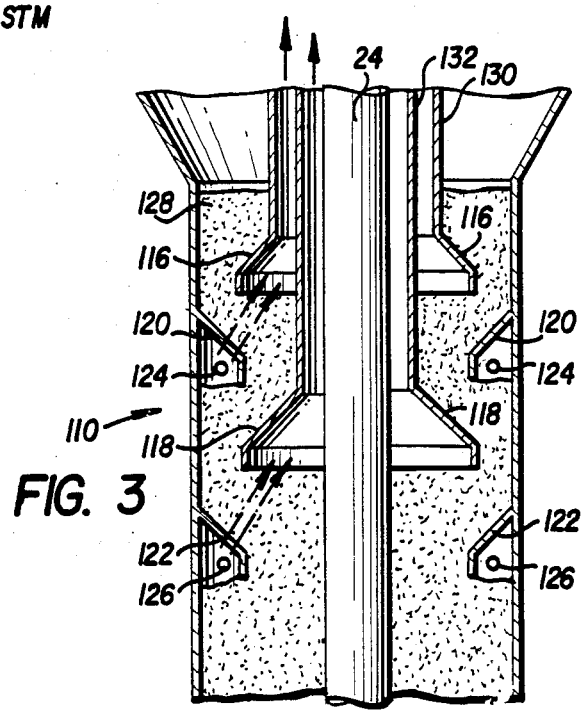
FIG. 3 is a side view partially in section of one embodiment of a short contact time catalyst stripper.

It has also been found desirable to maintain hydrocarbon vapor and hydrocarbon materials stripped from catalyst separate and apart from contact with other catalyst particles in order to prevent additional uncontrolled thermal cracking. FIG. 3 illustrates one embodiment of a short contact time (SCT) stripper 110 which is located concentrically around a riser conversion zone 24. A hydrocarbon/catalyst feed ascends vertically through the riser conversion zone 24, is passed through a suitable separator, e.g., a cyclone separator, is passed from the outlet of the separator to enter the upper portion of the SCT stripper 110, and descends toward a lower portion thereof. Baffles 116 and 118 serve to direct the descending separated catalyst particles towards perforated baffles 120 and 122. Steam is provided at outlets 124 and 126 and travels through only a portion of the flowing catalyst particles 128. The "portion" referred to is that catalyst located between the steam injection point and the intake of the inverted funnels. Since the steam does not flow through the catalyst particles above its associated funnel intake, it does not place the hydrocarbons entrained therewith in further contact with catalyst. Although all catalyst is contacted with steam, a given portion of the steam and hydrocarbon materials entrained therewith, does not contact all catalyst contained above the steam injection point.

It can be seen in FIG. 3 that the hydrocarbon material stripped from catalyst particles by the stripping steam is relatively quickly separated from further contact with catalyst particles, due to baffles 116 and 118 which serve as inverted funnels forcing the steam and carried hydrocarbon vapors into concentric pipes 130 and 132 for either further separation and/or stripping or fractionation (not shown). In the vertical arrangement shown in FIG. 3, the baffles 116 and 118 serve to move the catalyst in at least a partially horizontal direction, with perforated baffles 120 and 122 doing likewise. The catalyst particles 128 follow a circuitous route around the baffles which permits a number of steam exposure locations or "stages."

Figure 4:
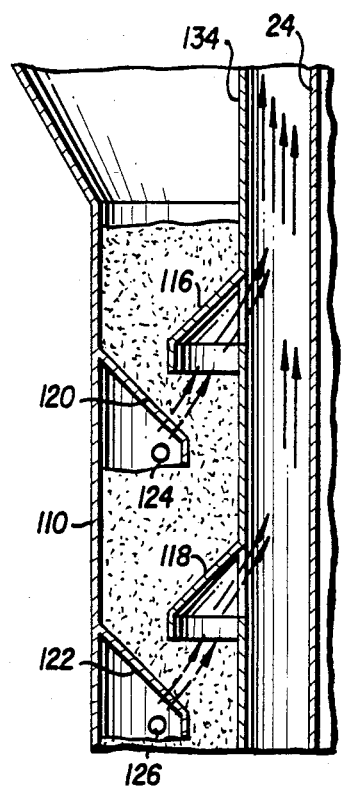
FIG. 4 is a side view partially in section of a further embodiment of a short contact time catalyst stripper.

Although the SCT stripper 110, shown in FIG. 3, is mounted concentrically around the hydrocarbon feed riser 24, the stripper could also be mounted separate and apart from the hydrocarbon feed riser, as shown, for example, in FIG. 10, where a catalyst stripper is located in the exhaust barrel of a separator. Furthermore, although two stages of steam injection are shown in FIG. 3, more or less stages could be added, depending on the desired amount of stripping and the desired level of complexity. Additionally, there is no requirement that the stripped hydrocarbon vapors be carried in separate conduits 130 and 132, as shown in FIG. 3. For example, as shown in FIG. 4, a single conduit 134 could be utilized in conjunction with baffles 116 and 118 and perforated baffles 120 and 122, in the manner similar to that discussed with reference to FIG. 3. However, it should be noted that although FIG. 4 illustrates an SCT stripper which includes the riser conversion zone 24 concentrically mounted therein, there is no requirement for a concentric riser location. Thus, like FIG. 3, the FIG. 4 stripper could be mounted elsewhere. The FIG. 4 type SCT stripper, without a concentric riser location, is illustrated in FIG. 10. It is understood that conduits 130 and 132 in FIG. 3 and 134 in FIG. 4 would conduct the stripped hydrocarbon vapors away from further contact with catalyst particles in order to avoid increased "residence" or "contact" time. Thus, the injected stripping gas, which is steam in a preferred embodiment, contacts only a portion of the catalyst which would normally be encountered in a conventional stripper and is conveyed away without additional catalyst contact.

In order to ensure that hydrocarbon vapors released in the stripper (whether an SCT stripper or the more conventional multi-stage stripper) travel either out of the cyclone separator exhaust (in the case of a multi-stage stripper) or through the appropriate stripper exhaust conduit (conduits 130 and 132 in FIG. 3 and 134 in FIG. 4 for the SCT stripper), it is necessary that the bottom of the strippers provide a sufficient resistance to gas flow in the downward direction. However, the lower portions cannot be completely sealed, as the catalyst particles gathering in the lower portion of the stripper must be removed for recycling and reuse in the reactor.

Figure 6:
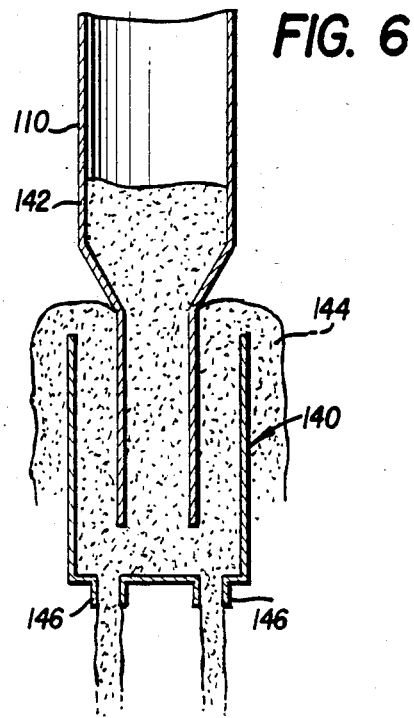
FIG. 6 is a side view partially in section of one embodiment of a catalyst seal pot.

In the past, the catalyst bed 60 served to provide a sufficient pressure differential to force gas flow in the desired direction. However, the large volume of catalyst in the bed and the requirement that the catalyst level extend to any separator dipleg (as in FIG. 1) provided additional catalyst through which injected stripping gas and separated hydrocarbons must pass, thus providing additional "residence" time and a further level of uncontrolled cracking for hydrocarbon in contact or entrained with the catalyst particles. Consequently, it has been found desirable to have the lower portion of the stripper unit received into a catalyst seal pot 140, as shown in FIGS. 6 and 10. With a seal pot, the level of catalyst 142 is maintained, such that the gas flow resistance from the catalyst level 142 through the seal pot and to the overflowing catalyst 144, is sufficient to prevent substantial hydrocarbon-laden steam flow therethrough. However, the volume of catalyst contained in the seal pot 140 is relatively small, such that any hydrocabon-laden steam which is entrained therein does not have the long "residence" time expected of the normal catalyst bed/dipleg seals.

Catalyst seal pot 140 has one or more drains 146 sized so as to permit a flow of catalyst at least equal to between 10 and 90% and preferably to between 30 and 50% of the catalyst flow rate through the catalyst seal pot. The remainder of the catalyst not flowing through drains 146 overflows the catalyst seal pot at 144, whereupon the overflowing and draining catalysts are recovered and reused. FIG. 6 illustrates a two drain seal pot, with FIG. 7 showing a single drain seal pot. In FIG. 7, the bottom of the seal pot has sloping sides 148, which serve to ensure that no catalyst will remain trapped within the seal pot and that ultimately all catalyst will drain or overflow therefrom. Although the angle β of the sloping sides 148 is not critical, the optimum angle would appear to be 60°.

The present invention can be combined with the SCT stripper, the stripper located in the exhaust barrel and the catalyst seal pot method steps and structures disclosed in the present application, all of which serve to reduce, in a number of different manners, the "residence" time during which hydrocarbon materials are in contact with catalyst particles. Various combinations of these steps and structures could be added to the method of and apparatus for deflecting catalyst particles toward a separator inlet in an existing fluid catalytic cracking method or system, with corresponding improvements in operating efficiency. All of these improvements could be utilized in a single fluid catalytic cracking process or apparatus, such as that illustrated in FIG. 10, which includes the catalyst particle deflectors 102 and 104, the catalyst stripper located in the barrel of cyclone separator 4, and the use of a two-stage short contact time stripper, sealed with a low volume catalyst seal pot 140.

Although the present invention has been described relative to a number of specific embodiments thereof, it is not so limited and many modifications and variations thereof will be readily apparent to those skilled in the art in light of the above teachings. It is, therefore, to be understood that within the scope of the appended claims the invention may be practiced otherwise than as specifically described.

The embodiments of the invention in which an exclusive property or privilege is claimed are defined as follows:

We claim:

1. A method of fluid catalytic cracking of a hydrocarbon feed comprising the steps of:
   passing a mixture, as a suspension, of said hydrocarbon feed and catalyst particles through a riser conversion zone having a diameter and contained within a reactor vessel and cracking said hydrocarbon feed in the riser conversion zone;
   passing said mixture through a deflection zone in which said mixture is physically deflected, by contact with a wedge-shaped deflection means located at a downstream end and integrally connected to said riser conversion zone, from said means for deflecting towards an inlet to a separation zone; and
   passing said deflected mixture through said separation zone inlet into said separation zone, wherein said separation zone is located outside said riser conversion zone.

2. The method according to claim 1, including after said passing steps, the additional steps of:
   separating at least a portion of the catalyst from the mixture in the separation zone;
   passing a gaseous effluent from the separation zone to a downstream fractionation apparatus;
   passing the separated catalyst from the separation zone to a catalyst stripping zone, said catalyst stripping zone using a stripping gas to remove hydrocarbon entrained with or absorbed by the separated catalyst;
   passing said stripping gas with removed hydrocarbons to said downstream fractionation apparatus; and
   passing said separated catalyst out of said stripping zone.

3. The method according to claim 1, including, after said passing steps, the additional steps of:
   separating at least a portion of the catalyst from the mixture in the separation zone;
   immediately stripping entrained and absorbed hydrocarbons from catalyst particles in said separated catalyst; and
   passing said stripped hydrocarbons to a stripper exit and passing said stripped catalyst to a catalyst regeneration system.

4. The method according to claim 1, including, after said passing steps, the additional steps of:
   passing said deflected mixture through said separation zone and through a catalyst stripping zone which includes a catalyst stripper; and passing said stripped catalyst through a dipleg extension and into a catalyst seal pot for sealing said dipleg, said seal pot including at least one drain sized for passing between 10 and 90% of said stripped catalyst out of said seal pot through said drain to a catalyst bed located a distance therebelow.

5. The method of claim 4, wherein between 30 and 50% of said stripped catalyst passes through said drain.

* * * * *